United States Patent [19]

Saito

[11] Patent Number: 5,600,617
[45] Date of Patent: Feb. 4, 1997

[54] DATA RECORDING DEVICE FOR MOTION PICTURE FILM

[75] Inventor: Etsuro Saito, Kanagawa, Japan

[73] Assignees: Sony Corporation, Tokyo, Japan; Sony Cinema Products Corporation, Culver City, Calif.

[21] Appl. No.: 408,841

[22] Filed: Mar. 23, 1995

[30] Foreign Application Priority Data

Mar. 31, 1994 [JP] Japan .................................. 6-063664

[51] Int. Cl.$^6$ .......................................................... G11B 7/00
[52] U.S. Cl. ............................... 369/97; 369/112; 352/11; 352/27
[58] Field of Search ............................... 369/97, 112, 54, 369/58, 47, 44.14, 44.11; 352/1, 11, 12, 26, 27, 28

[56] References Cited

U.S. PATENT DOCUMENTS

| | | |
|---|---|---|
| 3,932,032 | 1/1976 | Weinstein . |
| 4,461,552 | 7/1984 | Levine . |
| 4,544,259 | 10/1985 | Kanaoka et al. . |
| 4,771,415 | 9/1988 | Taki ........................................ 369/112 |
| 4,815,067 | 3/1989 | Webster et al. ........................... 369/97 |

OTHER PUBLICATIONS

Patent Abstracts of Japan vol. 013 No. 533 (P–967), 28 Nov. 1989, JP–A–01 219822 (Seiko Epson Corp) 1 Sep. 1989.
Patent Abstracts of Japan vol. 014 No. 398 (P–1097), 28 Aug. 1990, JP–A–02 150826 (Fuji Photo Film Co Ltd) 11 Jun. 1990.

Primary Examiner—Muhammad N. Edun
Attorney, Agent, or Firm—William S. Frommer; Alvin Sinderbrand

[57] ABSTRACT

A data recording device for a motion picture film is provided in which one ends of plural optical fibers are connected to light emitting devices and the other ends of the optical fibers are arrayed in accordance with a dot pattern of audio data to be recorded. The light emitting diodes are turned on responsive to the audio data to be recorded on the motion picture film. The audio data carrying light, produced by the turning on of the LEDs, is conducted via the optical fibers to a head unit so as to be radiated on the motion picture film via a radiating port of the head unit. By the above arrangement, the optical fibers may be arrayed optionally at the head unit without regard to the array of the LEDs. Consequently, the LEDs are affected to a lesser extent by heat evolved on turning on the LEDs. By linearly arraying the optical fibers at the head unit 1, a larger quantity of audio data may be recorded on the motion picture film.

4 Claims, 9 Drawing Sheets

DATA RECORDING DEVICE FOR MOTION PICTURE FILM

BACKGROUND OF THE INVENTION

This invention relates to a data recording device for a motion picture film for recording the digital speech information on a motion picture film in the form of dots.

In the motion picture film in general, frame-shaped picture recording areas are provided at a mid portion, and two rows of film take-up perforations are formed on both sides of the picture recording areas. An analog sound track is formed is formed along a straight line between the picture recording areas and one of the rows of perforations. It is on this analog sound track that audio signals are recorded in an analog form.

Recently, with the progress in the digital techniques, attempts are being made for digitally recording the audio information. Since the recording positions for the picture recording regions and the analog sound tracks are standardized by the Society of Motion Picture and Television Engineers (SMPT), an association of motion picture and television engineers in U.S.A., the digitized audio information (audio data) are recorded in positions other than the recording positions for the picture recording regions or the analog sound track.

Up to now, a redundant area between the right-hand side perforations and the right-hand side edge of the motion picture film was allocated for a digital sound track for the right channel, and a redundant area between the left-hand side perforations and the left-hand side edge of the motion picture film was allocated for a digital sound track for the left channel. The audio data was recorded along a straight path on each of the digital sound tracks along the film running direction.

Specifically, a light shutter type data recording apparatus has been known as a device for recording the audio data.

The light shutter data recording device has a photo-electric device, such as a so-called PLZT plate, having plural shutter portions arrayed in a staggered configuration. A laser beam is radiated from the rear side of the PLZT plate, and the opening/closure of the respective shutter portions of the PLZT plate is controlled responsive to the audio data. Thus the laser beam is transmitted through the PLZT plate via the opened shutter portions.

Since the respective shutter portions of the PLZT plate are opened and closed responsive to the audio data, the laser beam transmitted through the PLZT plate carries the information corresponding to the electrical audio data and is radiated as audio data converted into light (audio data carrying light).

The audio data carrying light, radiated from the PLZT plate, is converged by a recording lens so as to be illuminated on the digital sound tracks on the motion picture film.

This sensitizes the motion picture film in dependence upon the audio data carrying light, so that the audio data is recorded thereon in the form of dots.

The data recording device for a motion picture film may also be designed to have a head unit including an array of light emitting diodes (LEDs) corresponding to a data pattern.

With such data recording device, the light emitting diodes are turned on in dependence upon the audio data. This translates the electrical audio data into the audio data carrying light which is illuminated via a recording lens on the digital sound tracks of the motion picture film. Thus the motion picture film is sensitized in dependence upon the audio data carrying light for recording the audio data thereon in the form of dots.

With the above-described light shutter data recording apparatus, employing the photo-electric device, such as the PLZT plate, the shutter portions could not but be arranged in a staggered configuration for constructional reasons, such as due to the electrode array of the photo-electric devices. Thus the audio data are recorded in a staggered configuration on the motion picture film, while they cannot be recorded on a straight path, so that only a small quantity of audio data can be recorded on the motion picture film.

On the other hand, with the data recording device for the motion picture film having the LED array as the head unit, the audio data can be recorded linearly, because the LEDs can be arrayed linearly. However, if one-line audio data, for example, is recorded by 80 dots, it is necessary to array 80 LEDs with a narrow gap between the neighboring LEDs.

The current required to turn on a LED is e.g., 20 mA, so that the current of 1.6 A is required to turn on the 80 LEDS. Thus a large quantity of heat is evolved during the time of turning on of the LEDs, thus reducing the life of the LEDs under the effect of heat. In addition, a heat sink for heat dissipation is required, thus raising the problem in durability and cost.

SUMMARY OF THE INVENTION

It is therefore an object of the present invention to provide a data recording device for a motion picture film which is capable of linearly recording audio data and which may be improved in durability and cost.

According to the present invention, there is provided a data recording device for a motion picture film including a plurality of light emitting devices adapted for being turned on responsive to audio data to be recorded for transforming electrical audio data into the audio data carrying light which is radiate, a plurality of optical fibers connected at one ends to light exit ends of the light emitting devices and adapted for conducting the audio data carrying light radiated from the light emitting, devices to the other ends thereof for radiating the audio data carrying light, and a head unit for arraying the other ends of the optical fibers according to a pre-set pattern and for illuminating the outgoing audio data carrying light at the other ends of the optical fibers via a radiating port thereof on the motion picture film.

The data recording device for a motion picture film also includes separators for separating the radiating port of the head unit into plural port sections each allocated to each optical fiber, and light barrier plates for providing substantially rectangular radiating port sections of the head unit provided with the separators.

The data recording device for a motion picture film also includes a light path forming unit provided on the head unit for radiating the audio data carrying light from the optical fibers via substantially rectangular light paths, and separators for separating a radiating port of the light path forming unit into plural port sections each allocated to each optical fiber.

The data recording device for a motion picture film additionally includes a light scattering plate provided at a radiating port of the head unit or at radiating port sections of the light path forming unit.

With the data recording device according to the present invention, since the optical fibers are arrayed at the head unit in accordance with the data pattern, and the audio data carrying light from the light emitting devices may be conducted to the optical fibers so as to be illuminated via the head unit on the motion picture film, the optical fibers may be arrayed linearly and hence the audio data may be linearly recorded on the motion picture film for increasing the quantity of the recordable audio data.

On the other hand, the LEDs may be arrayed on a circuit board with a broader space allowance without regard to the optical fiber arraying intervals at the head unit. The result is that the LEDs remain unaffected by heat evolved on turning on of the neighboring LEDs to protract the service life of the recording device. The heat sink for heat dissipation may be eliminated for simplifying the construction and reducing the production cost of the recording device.

Since the radiating port of the head unit is separated by the separators into plural port sections each associated with the individual optical fiber, and light barrier plates are provided for defining substantially rectangular radiating port sections of the head unit formed by the separators, the audio data carrying light radiated from the LEDs are rectangular in shape to assure rectangular-shaped data pattern recorded on the motion picture film.

Since the data recording device includes a light path forming unit provided on the head unit for radiating the audio data carrying light from the optical fibers via substantially rectangular light paths, and separators for separating a radiating port of the light path forming unit into plural port sections each allocated to each optical fiber, the audio data carrying light radiated from the LEDs are rectangular in shape to assure a rectangular-shaped data pattern recorded on the motion picture film.

Ultimately, the data recording device has a light scattering plate provided at a radiating port of the head unit or at radiating port sections of the light path forming unit, the light volume of the audio data carrying light illuminated on the motion picture film may be substantially equalized from one data pattern to another to enable the data patterns to be recorded uniformly without variations.

DETAILED DESCRIPTION OF THE INVENTION

Figure 1:
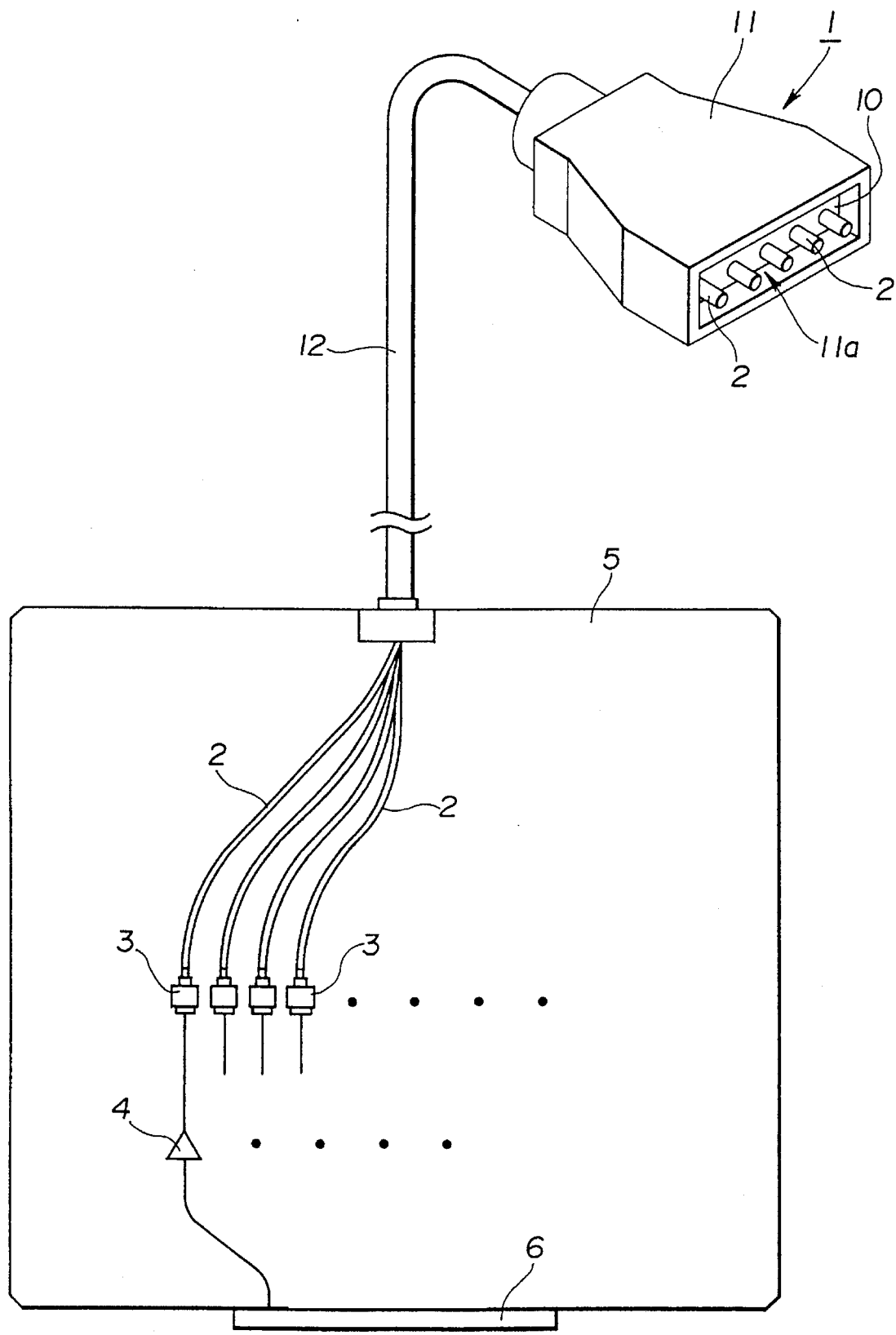
FIG. 1 is a schematic view showing an arrangement of a data recording device for a motion picture film according to a first embodiment of the present invention.

Referring to the drawings, preferred embodiments of a data recording device for a motion picture film according to the present invention will be explained in detail.

Referring first to FIG. 1, the data recording device according to the first embodiment of the present invention has a head unit 1 for radiating the audio data carrying light ion a motion picture film, plural optical fibers 2 having one ends arrayed by the head portion 1 in accordance with a data pattern to be recorded, plural light emitting diodes (LEDs) 3 respectively connected to the opposite ends of the light fibers 2 and adapted for being turned on responsive to the audio data to be recorded, and plural amplifier circuits 4 for supplying audio data amplified at a pre-set gain to the LEDs 3.

In the present embodiment, one-line audio data are recorded on the motion picture film with e.g., 64 dots, and the audio data are recorded on the line basis, as will be explained subsequently. Consequently, 64 each of the optical fibers 2, LEDs 3 and the amplifier circuits 4 are provided and housed within a circuit board 5.

The portions of the light fibers 2 exiting the circuit board 5 are sheathed together in a fiber cover 12 so as to be conducted to the head unit 1.

The input sides of the amplifier circuits 4 are connected to a connector terminal 6 of the circuit board 5. The connector terminal 6 is fed with audio data from an encoder, not shown.

Figure 2:
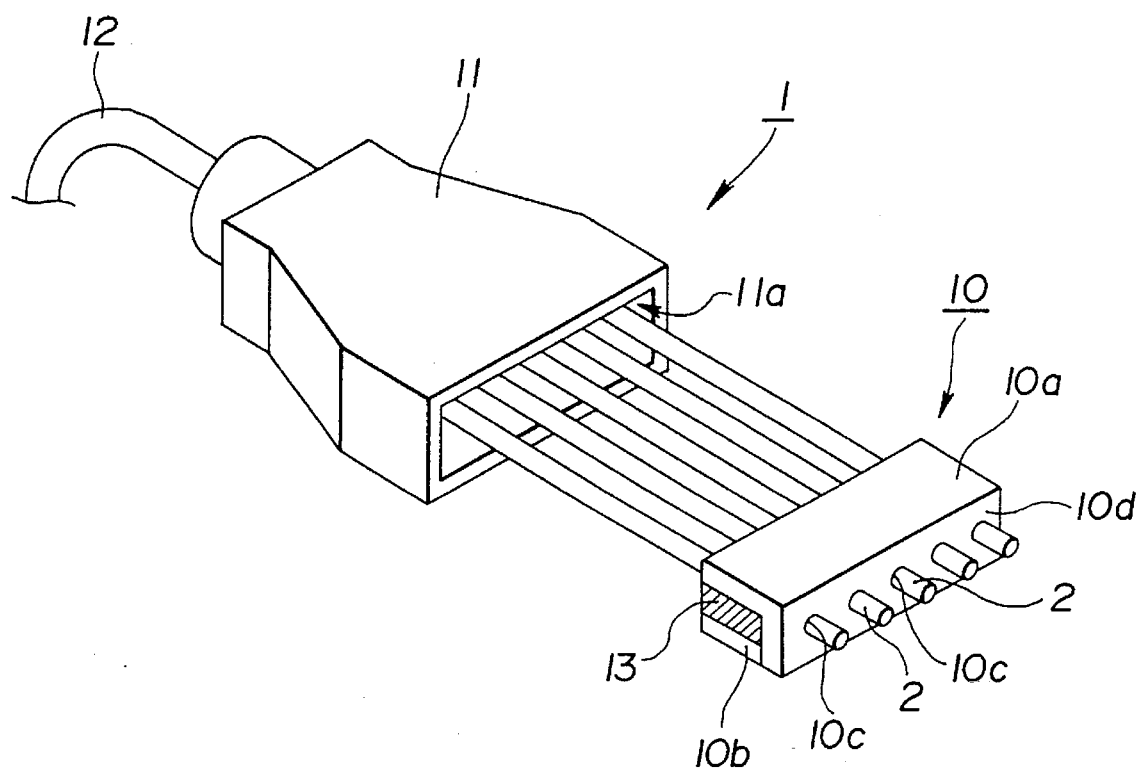
FIG. 2 is a schematic view showing an arrangement of a head unit provided in the data recording device shown in FIG. 1.

The head unit 1 is made up of a substantially U-shaped head 10 and a head cover 11 for sheathing the head 10 having a substantially U-shaped radiating port 11a, as shown in FIG. 2. The head 10 has an upper head portion 10a, a lower head portion 10b and a connecting forward portion 10d having e.g., 64 through-holes 10c for the optical fibers larger in diameter than the diameter of the optical fibers 2. These through-holes 10c are bored in a linear array in the connecting forward portion 10c in accordance with the recording data pattern.

The optical fibers 2 are conducted by the fiber cover 12 into the inside of the head cover 11 and thence conducted via the radiating port 11a of the head cover 11 to the through-holes 10c of the head 10. After being passed through the through-holes 10c, the optical fibers 2 are straightened at the forward ends and secured with an adhesive 13 in the head 10 against wobbling. After the optical fibers 2 are secured with the adhesive 13, the head 10 is sheathed with the head cover 11 to complete the head unit 1.

Figure 3:
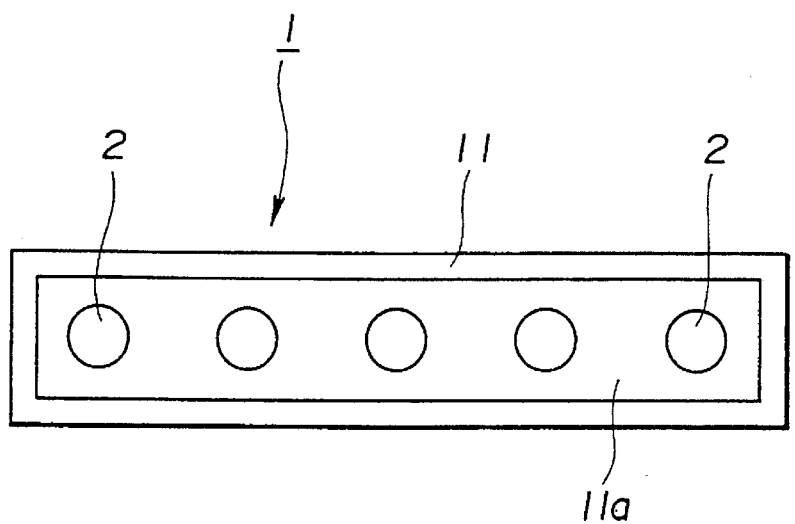
FIG. 3 is a front view showing a light outgoing end of the head unit.

The head cover 11 is sheathed over the head 10 so that the forward portions of the optical fibers 2 protruded from the head 10 vertically coincide with the radiating port 11a, or alternatively the radiating port 11a is slightly protrude from the forward ends of the optical fibers 2. Thus the front portion of the head unit 1 is so configured that the distal ends of the optical fibers 2 are exposed at the radiating port 11a, as shown in FIG. 3.

The operation of the data recording device for the motion picture film according to the first embodiment is hereinafter explained.

Figure 4:
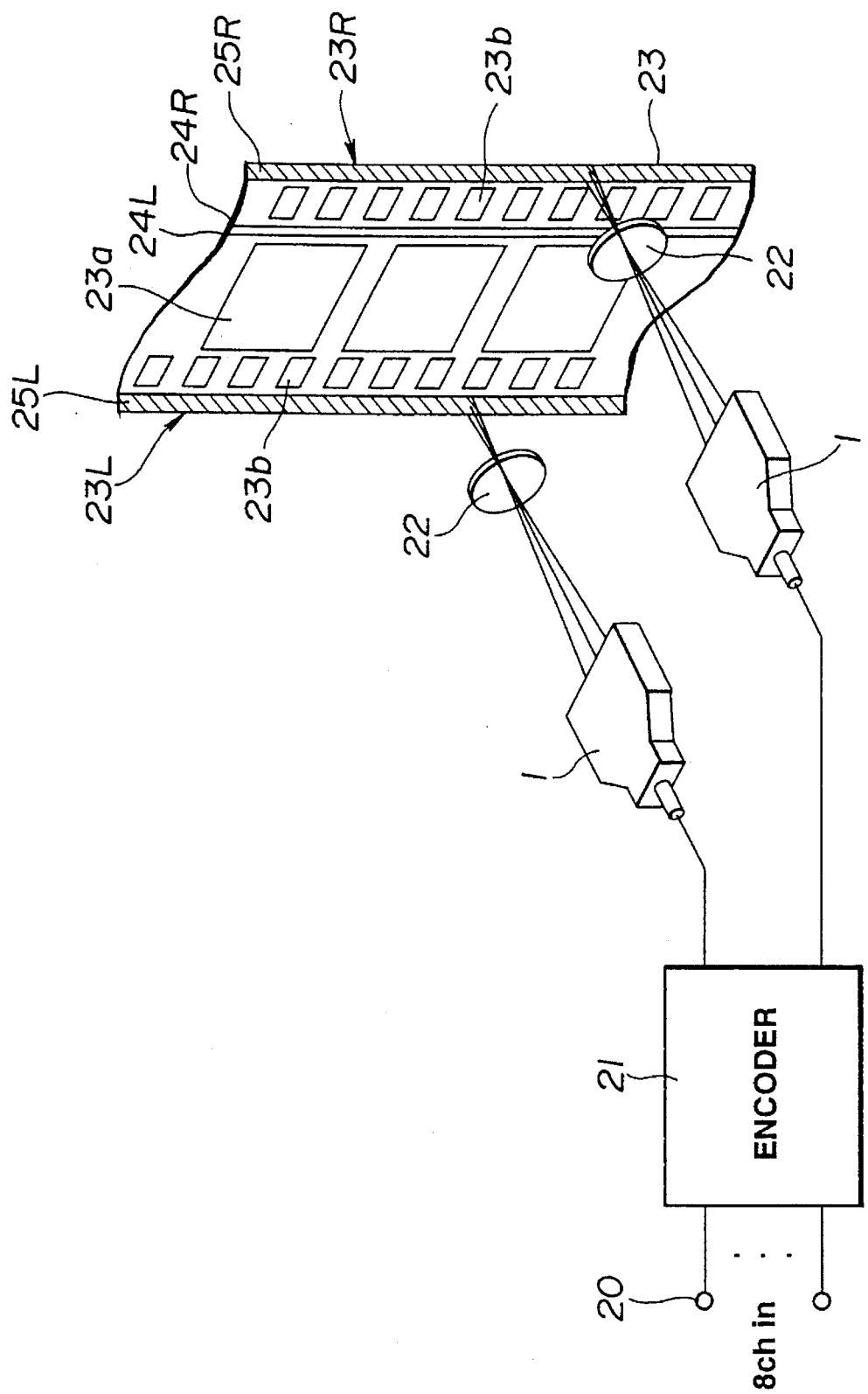
FIG. 4 is a schematic view showing the manner in which audio data is recorded by the data recording device shown in FIG. 1.

Referring to FIG. 4, the audio data is supplied to an encoder 21 via eight-channel input terminals 20. The encoder 21 encodes the audio data in a manner suited for recording and transmits the encoded data to the connector terminal 6. The audio data, routed to the connector terminal 6, is amplified at a pre-set gain by the respective amplifier circuits 4 and thence routed to respective light emitting diodes 3. These light emitting diodes 3 are turned on responsive to the audio data so that the electrical audio data is now translated into the audio data carrying light, which is outputted.

The audio data carrying light is conducted by the optical fibers 2 to the distal ends of the fibers 2 so as to be radiated via the radiating port 11a.

Turning again to FIG. 4, the data recording device has two of the above-described head units 1, that is a head unit four the right channel and a head unit for the left channel, each of which is mounted facing a motion picture film (negative film)

The motion picture film 23 has picture recording areas 23a at its mid portion and left and right rows of perforations 23b on both sides of the picture recording areas 23a. Analog sound tracks 24R, 24L for the right and left channels are provided between the right row of the perforations 23b and the picture recording areas 23a.

Since the recording positions for the picture recording areas 23a, perforations 23b and the analog sound tracks 24R, 24L are standardized by the Society of Motion Picture and Television Engineers (SMPT), an association of motion picture and television engineers in USA, the digitized audio information (audio data) are recorded in positions other than the recording positions for the picture recording areas or the analog sound tracks 24R, 24L.

With the data recording device for the motion picture film of the present embodiment, a redundant area between the right-hand side perforations 23b and a right-hand side edge 23R of the motion picture film is allocated for a digital sound track 25R for the right channel, and a redundant area between the left-hand side perforations 23b and a left-hand side edge 23L of the motion picture film is allocated for a digital sound track 25L for the left channel. The audio data is recorded along a straight path on each of the digital sound tracks 25R, 25L along the film running direction.

Thus the head units 1 for the respective channels are mounted facing the digital sound tacks 25R, 25L, and the audio data carrying light, radiated via the head units 1, are illuminated via a recording lens 22 on the digital sound tracks 25R, 25L. This exposes the digital sound tracks 25R, 25L of the motion picture film 23 to light so that the dot patterns oil the audio data corresponding to the arraying states of the optical fibers 2 linearly arrayed in the head units 1 are recorded line-by-line on the digital sound tracks 25R, 25L.

Figure 5:
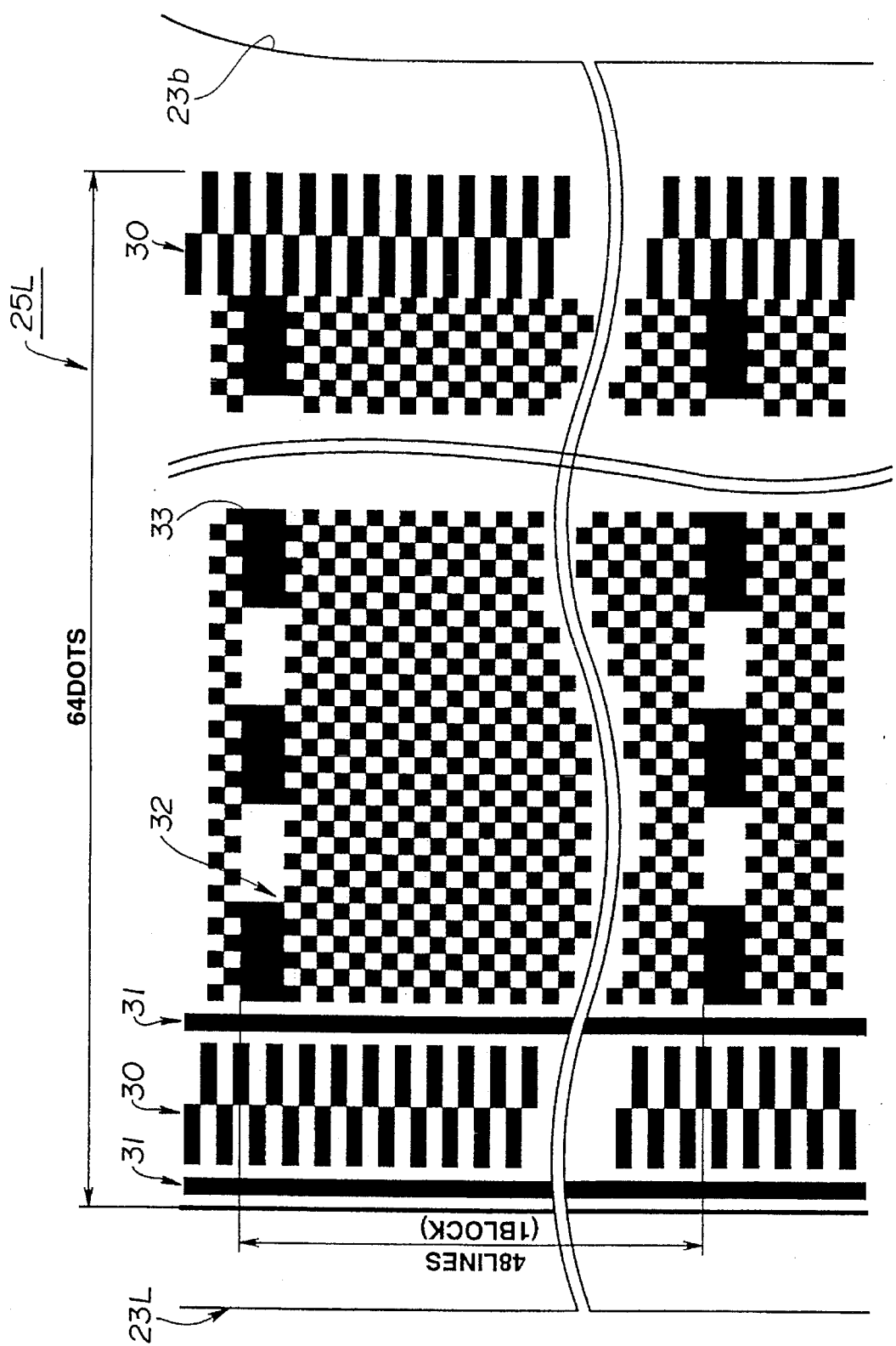
FIG. 5 is a plan view showing a data pattern of the audio data recorded by the recording device shown in FIG. 1.

Specifically, the audio data recorded on the digital sound track 25L for the left channel is recorded at a rate of 64 dots per line in a direction at right angle to the film proceeding direction, as shown in FIG. 5. The audio data are recorded with e.g., 48 lines as one block. At the leading end of each block are recorded three lines of synchronization data 32 for block synchronization. Each line of the synchronization data is comprised of a pattern of repetition of six white dots and six black dots. At the trailing end of the synchronization data 32 is recorded audio data 33.

On both sides of the synchronization data 32 and the audio data 33, there is recorded a tracking pattern 30 of while and black dots in a staggered configuration for extending in the film running direction.

On both sides of the tracking pattern 30 on the left edge 23L for the left digital sound track 25L an identification pattern of black dots 31, as means for facilitated discrimination of the boundary line between the tracking pattern 30 and the audio data 33 (and the synchronization data 32), for extending in the film running direction. A similar identification pattern is formed on the right-hand side edge 23R for the right channel digital sound track 25R.

With the data recording device for the motion picture film of the present embodiment, since the audio data carrying light from the respective LEDs 3 is conducted by the optical fibers 2, the interval between adjoining LEDs 3 may be selected to a larger value without regard to the array of the optical fibers 2 in the head unit 1.

Thus it becomes possible to protect the LEDs 3 against ill effects of heat evolution of the lighted LEDs and to protract the service life of the LEDs 3. In addition, since there is no necessity of providing a heat sink for heat dissipation, the recording device may be improved in durability and in production cost.

Since the optical fiber 2 is arranged linearly in the head unit 1, it becomes possible to record the dot pattern of the audio data linearly on the digital sound tracks 25R, 25L and hence to increase the quantity of the recorded audio data.

Of course, the dot pattern can be arrayed in a staggered configuration by adjusting the arraying state of the optical fibers 21 on the head unit 1.

The audio data carrying light radiated from the optical fibers 2 is fluctuated in light intensity from the center towards the peripheral region. In this consideration, a scattering plate, not shown, may be provided at the radiating port 11a of the head unit 1 for radiating the light carrying the audio data via the scattering plate. This allows the audio data carrying light illuminated on the digital sound tracks 25R, 25L to be scattered unanimously for substantially equalizing the volume of light constituting the dot pattern. Thus the dot pattern may be recorded uniformly without variation.

Figure 6:
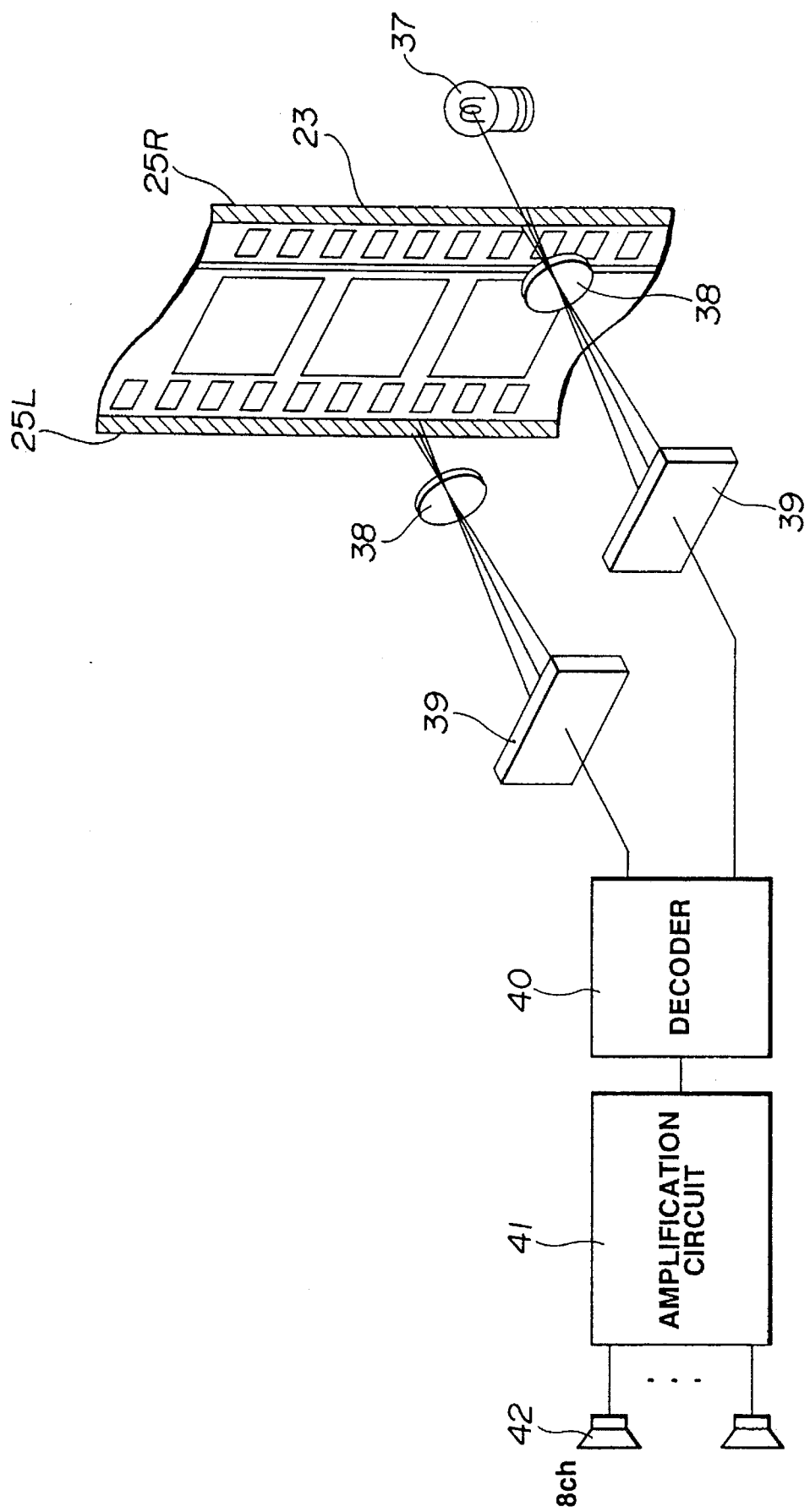
FIG. 6 is a schematic view showing an arrangement of a data reproducing device for reproducing data recorded on a motion picture film.

The audio data thus recorded on the motion picture film is reproduced by a data reproducing device shown in FIG. 6.

For reproducing the audio data, two halogen lamps 37 radiate the light on the digital sound tracks 25R, 25L of the motion picture film (positive film) 23 as shown in FIG. 6. Since the audio data are recorded as white and black dot patterns, only the light illuminated on the white dot pattern is transmitted through the digital sound tracks 25R, 25L. Thus the light from the halogen lamp 37 transmitted through the digital sound tracks is converted into the light bearing the information and is incident on a playback lens 38 as the audio data carrying light.

The playback lens 38 converges the audio data carrying light for illumination on a CCD line sensor 39 for each channel. Each CCD line sensor 39 receives the light bearing the audio data and generates electrical signals corresponding to the received light level, that is electrical audio data, which is fed to a decoder 40.

The decoder 40 executes decoding, which is a counterpart operation of the encoding executed during recording, and routes the decoded data to an amplifier circuit 41. The amplifier circuit 41 amplifies the decoded audio data with a pre-set gain and transmits the amplified data to, for example, an eight-channel speaker unit 42. Thus the speech output corresponding to audio data reproduced from the digital sound tracks 25R, 25L of the motion picture film 23 may be produced at the speaker units 42.

The tracking pattern recorded on each of the digital sound tracks 25R, 25L is recorded so that the boundary between the white and black dots is positioned on a line of extension of the audio data, as shown in FIG. 5. Thus, during audio data reproduction, the on-track state is indicated by the detection level of the tracking pattern 30 being an intermediate level between the black dot detection level and the white dot detection level.

Thus the audio data may be correctly reproduced at all times in the on-track state by controlling the readout and tilt of the CCD line sensor 39 or the tilt of the motion picture film 23 so that the detection level of the tracking pattern 30 is perpetually at the above-mentioned intermediate level in the course of audio data reproduction.

The data recording device for the motion picture film according to a second embodiment of the present invention is now explained.

Figure 7:
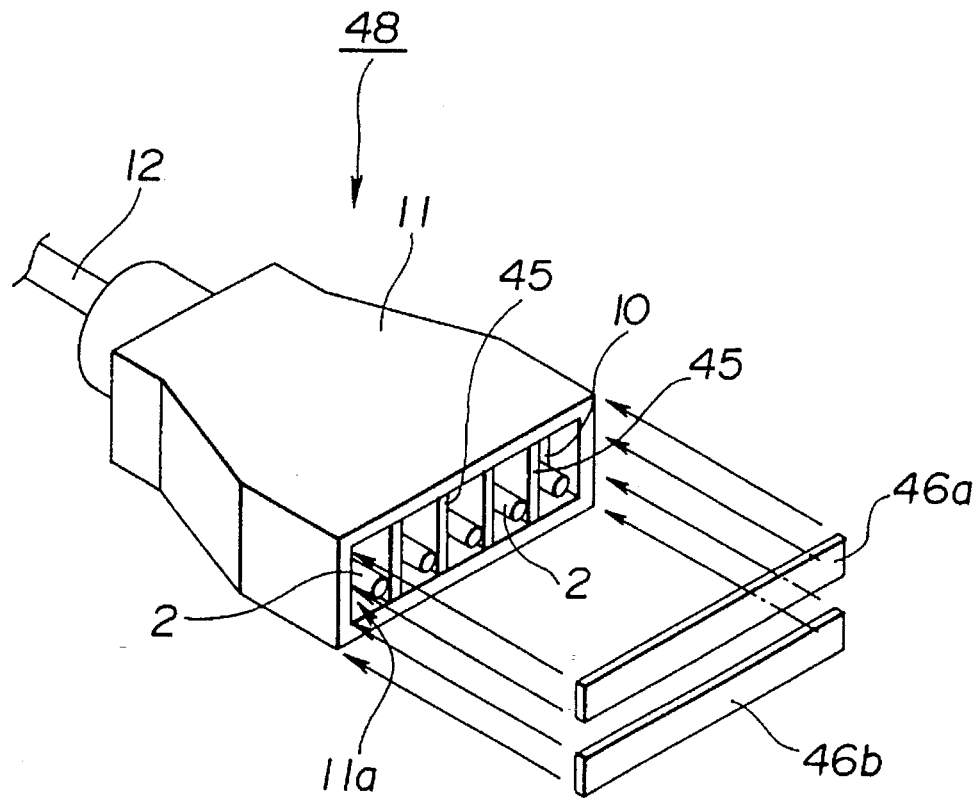
FIG. 7 is a perspective view showing an arrangement of a head unit provided in the data recording device according to a second embodiment of the present invention.
Figure 8:
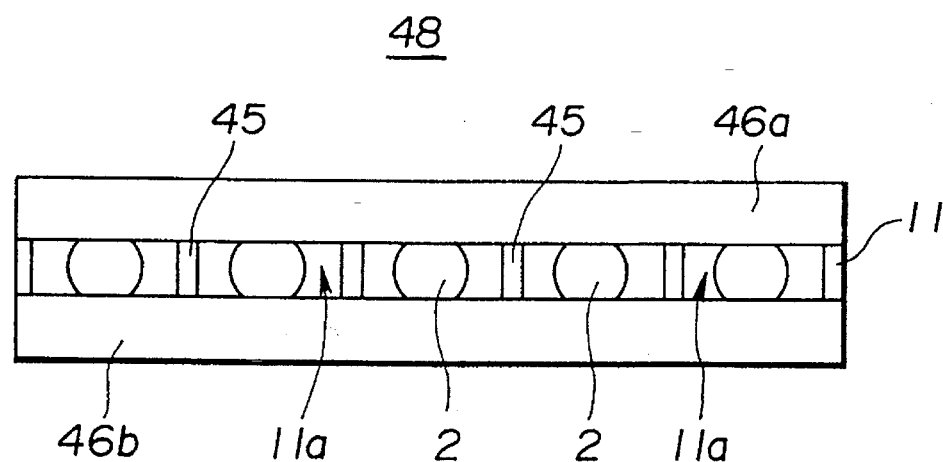
FIG. 8 is a front view showing a head unit of a data recording device for a motion picture film shown in FIG. 7.

The present second embodiment of the data recording device for the motion picture film differs from the previous first embodiment only by changing the constitution of the head unit 1 to the constitution of a head unit 48 shown in FIG. 7. Consequently, only the constitution of the head unit 48 is explained in the present explanation of the data recording device of the present second embodiment, while the explanation of the remaining components is omitted. In addition, the parts or components which are the same as those of the head unit 1 are denoted by the same numerals and the corresponding explanation is similarly omitted.

In FIG. 7, the head unit 48 includes separators 45 provided in the radiating port 11a for separating the radiating port 11a into plural regions each allocated to each optical fiber 2 and light barrier plates 46a, 46b for partially covering the radiating port 11a so that the radiating ports now assume the shape of horizontally elongated rectangles.

By the above constitution, the audio data carrying light radiated by the optical fibers 2 is shielded by the light barrier plates 46a, 46b so that the spot shape of the audio data carrying light radiated from the radiating port 11a will be substantially in the form of horizontally elongated rectangles.

For recording audio data on the digital sound tracks 25R, 25L, the motion picture film 23 is run at a pre-set speed. With the present embodiment of the data recording device for the motion picture film, since the spot shape of the audio data carrying light illuminated on the digital sound tracks 25R, 25L can be formed into substantially rectangular shape, the dot patterns of the audio data recorded on the digital sound tracks 25R, 25L may be rendered substantially square-shaped by reason of the illuminating time of the audio data carrying light and the running speed of the motion picture film.

Consequently, the dot patterns of the audio data of the respective lines may be aligned for increasing the recording volume of the audio data and contributing to correct audio data reproduction.

The audio data carrying light radiated by the respective optical fibers 2 undergo fluctuations in the light volume from the center towards the periphery, as discussed previously. In this consideration, a scattering plate, not shown, may be provided at the radiating port 11a of the head unit 48 for radiating the audio data carrying light via the scattering light. This allows the audio data carrying light illuminated on the digital sound tracks 25R, 25L to be scattered unanimously for substantially equalizing the volume of light constituting the dot pattern. Thus the dot pattern may be recorded uniformly without variation.

The data recording device for the motion picture film according to a third embodiment of the present invention is now explained.

Figure 9:
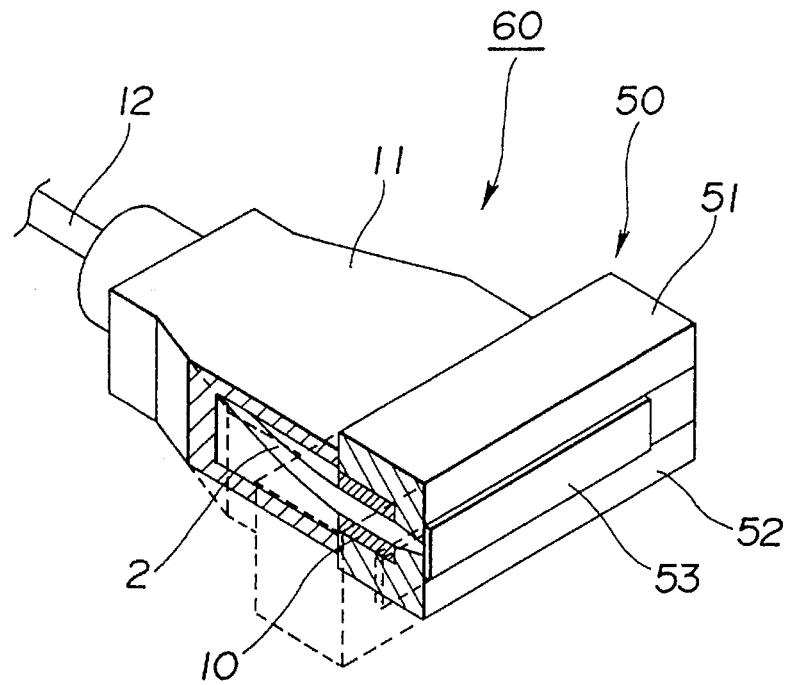
FIG. 9 is a perspective view showing an arrangement of a head unit provided in the data recording device according to a third embodiment of the present invention.

The present third embodiment of the data recording device for the motion picture film differs from the previous first embodiment only by changing the constitution of the head unit 1 to the constitution of a head unit 60 shown in FIG. 9. Consequently, only the constitution of the head unit 60 is explained, while the explanation of the remaining components is omitted. In addition, the parts or components which are the same as those of the head unit 1 are denoted by the same numerals and the corresponding explanation is similarly omitted.

Referring to FIG. 9, the head unit 80 has a light path forming unit 50, to which the head cover 11 is secured.

Figure 10:
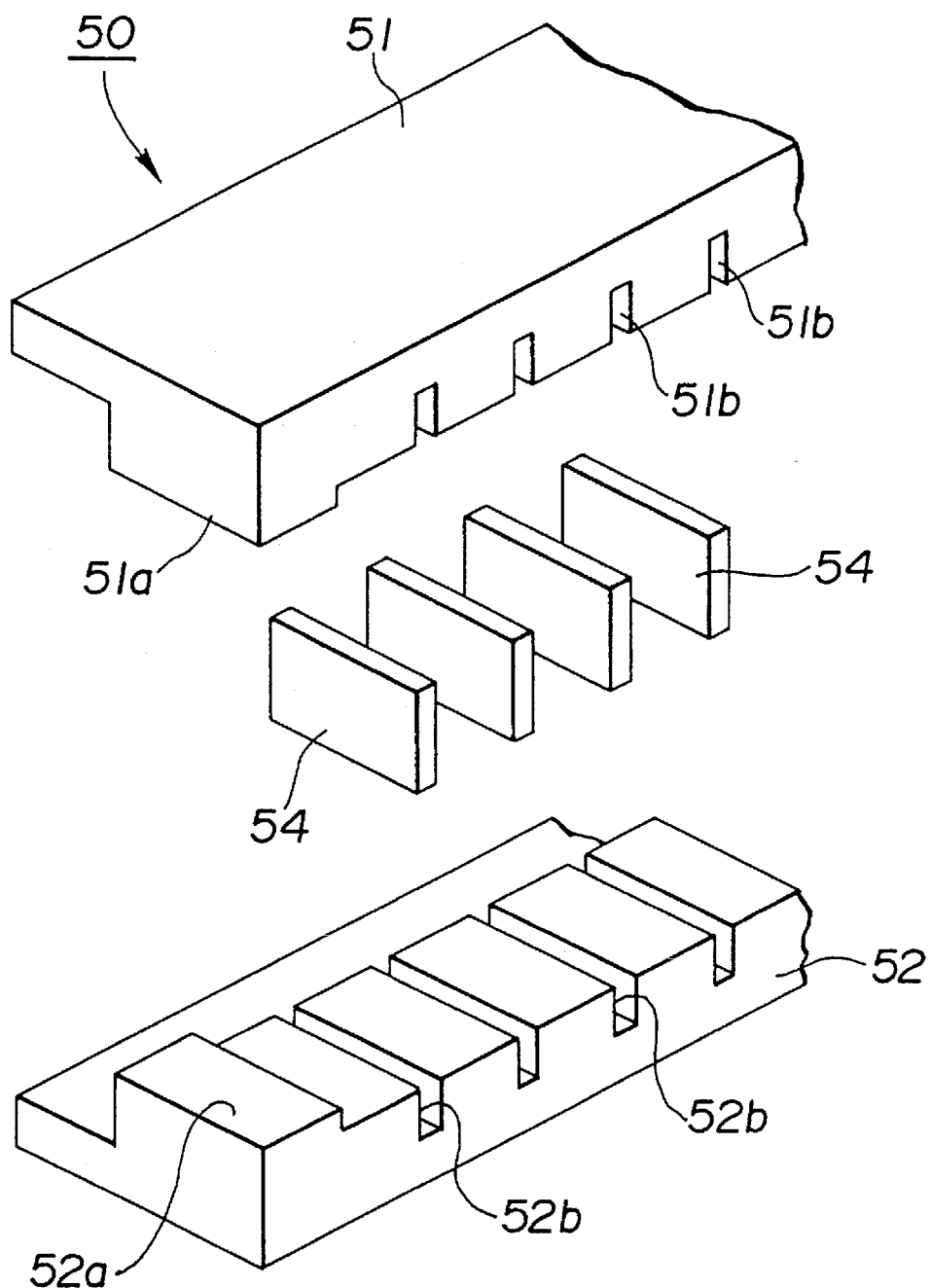
FIG. 10 is an exploded perspective view showing a light path forming means provided in the head unit of the data recording device shown in FIG. 9.

The light path forming unit 50 is made up of an upper light path forming portion 51, a lower light path forming portion 52 and a separator 54, as shown in FIG. 10.

The upper light path forming portion 51 has plural separator holding grooves 51b in association with the optical fibers 2. The separator holding grooves are sized to sufficiently hold the separators 54. Both ends of the upper light path forming means 51 are provided with adhesive surfaces 51a for assuring adhesion to the lower light path forming portion 52.

Similarly to the upper light path forming portion 52, the lower light path forming portion 52 has plural separator holding grooves 52b in association with the optical fibers 2. The separator holding grooves are sized to sufficiently hold the separators 54. Both ends of the lower light path forming means 52 are provided with adhesive surfaces 52a for assuring adhesion to the upper light path forming portion 51.

Figure 11:
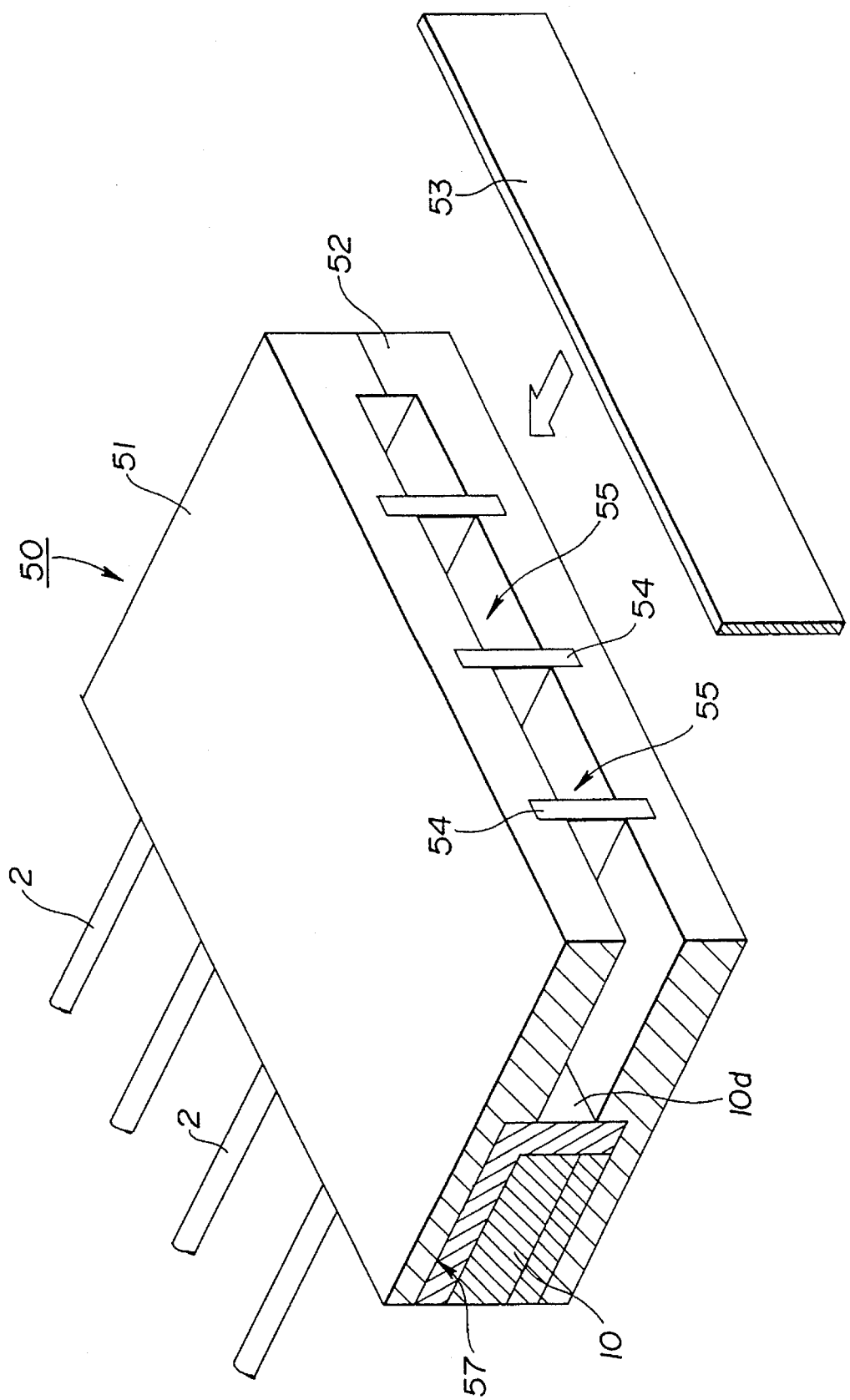
FIG. 11 is an exploded perspective view showing the light path forming means shown in FIG. 10.

The separator grooves 51b, 52b are formed for facing each other when the adhesive surfaces 51a 52a of the light forming portions 51, 52 are bonded to each other, as shown in FIG. 11. Thus, when the separators are inserted into the separator holding grooves 51b, 52b and the adhesive surfaces 51a, 52a are bonded together, there are formed a number of substantially rectangular-shaped plural radiating ports 55 corresponding to the number of the optical fibers 2. These radiating ports are smaller in size than the front portion 10d of the head 10 and which are provided with a scattering plate 53.

Consequently, when the light path forming unit 50 is viewed from the front side, the radiating ports 55 are sheathed by the scattering plate 53.

When the adhesive surfaces 51a, 52a of the upper and lower light path forming portions 51, 52 are bonded together for defining the light path forming unit 50, a head housing section 57 slightly larger in size than the outer contour of the head 10 is defined on the opposite side of the light path forming unit 50 with respect to the radiating ports 55, as shown in FIG. 11. The head 10 is housed within this head housing section 57.

Figures 12A, 12B:
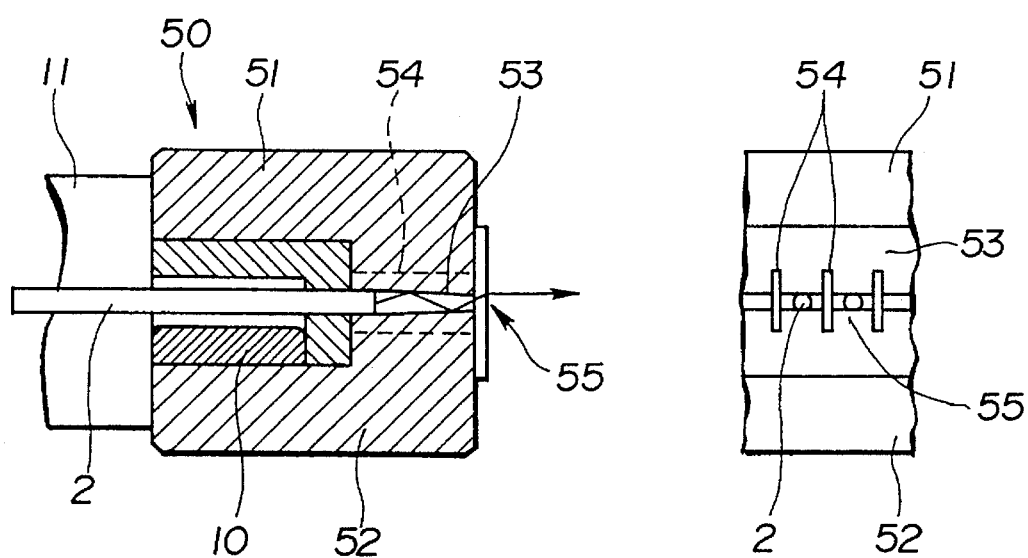
FIGS. 12A and 12B are cross-sectional view of the head portion showing the manner in which the audio data carrying light is radiated va the light path forming means.

The head unit 60 is constituted by bonding the head cover 11 to the reverse surface of the light path forming unit 50 housing the head 10, as shown in FIG. 12a.

Consequently, when recording the audio data, the dot patterns of the audio data recorded on the digital sound tracks 25R, 25L may be rendered substantially square-shaped by reason of the illuminating time of the audio data carrying light and the running speed of the motion picture film 23.

Thus the dot patterns of the audio data of the respective lines may be aligned for increasing the recording volume of the audio data and contributing to correct audio data reproduction.

On the other hand, since the audio data carrying light radiated from the radiating ports 55 is suitably scattered by the scattering plate 53 before being illuminated on the digital sound tracks 25R, 25L, the audio data carrying light illuminated on the digital sound tracks 25R, 25L may be scattered unanimously for substantially equalizing the volume of light constituting the dot pattern. Thus the dot pattern may be recorded uniformly without variation.

Meanwhile, with the present third embodiment of the data recording device for the motion picture film, the scattering plate may be omitted, in which case the square-shaped dot pattern may be recorded on the motion picture film 23, as discussed previously.

The numerical indications in the above description, such as 64 dots per line for the audio data recorded on the motion picture film 23 or 64 optical fibers, 64 LEDs 3 or 64 amplifier circuits 4, are given only for illustration and may be changed in desired manner. For example, the number of audio data per line may be 90, in which case the number of the optical fibers 2, LEDs 3 and the amplifier circuits 4 may similarly be set to 90. Various modifications may be additionally made within the scope of the present invention.

What is claimed is:

1. A data recording device for a motion picture film comprising:

a plurality of light emitting devices adapted for being turned on responsive to audio data to be recorded and for transforming electrical audio data into audio data carrying light which is radiated;

a plurality of optical fibers connected at first ends to light exit ends of the light emitting devices and adapted for conducting the audio data carrying light radiated from the light emitting devices to second ends thereof for radiating the audio data carrying light; and a head unit for arraying the second ends of the optical fibers according to a pre-set pattern, for providing heat dissipation by placing a gap of predetermined size between adjoining second ends of the optical fibers thereby eliminating the need for a heat sink and for illuminating the outgoing audio data carrying light at the second ends of the optical fibers via a radiating port thereof on the motion picture film.

2. The data recording device for the motion picture film as claimed in claim 1 further comprising:

means for running said motion picture film at a pre-set running speed, separators for separating the radiating port of the head unit into plural port sections each allocated to a respective optical fiber; and light barrier plates for generating substantially square-shaped dot patterns on the motion picture film, said light barrier plates forming substantially rectangular radiating port sections of the head unit to compensate for illuminating time of said audio data carrying light and said running speed of the motion picture film.

3. The data recording device for the motion picture film as claimed in claim 1 further comprising:

means for running said motion picture film at a pre-set running speed;

a light path forming unit provided on the head unit for radiating the audio data carrying light from the optical fibers via substantially rectangular light paths to compensate for illuminating time of said audio data carrying light and said running speed of the motion picture film thereby generating substantially square-shaped dot patterns on the motion picture film; and separators for separating a radiating port of the light path forming unit into plural port portions each allocated to respective optical fiber.

4. The data recording device for the motion picture film as claimed in claim 1 further comprising:

a light path forming unit provided on the head unit for radiating the audio data carrying light from the optical fibers via substantially rectangular light paths to compensate for illuminating time of said audio data carrying light and said running speed of the motion picture film thereby generating substantially square-shaped dot patterns on the motion picture film; and a light scattering plate provided at the radiating port of the head unit or at radiating port portions of the light path forming unit for uniformly scattering the audio data carrying light to generate unvarying dot patterns on the motion picture film.

* * * * *